(12) United States Patent
Whitehead et al.

(10) Patent No.: US 7,463,830 B2
(45) Date of Patent: Dec. 9, 2008

(54) MODULAR OPTICAL TRANSMITTER FOR WWDM TRANSCEIVERS

(75) Inventors: Thomas Whitehead, Chicago, IL (US); Matthew Block, Maple Park, IL (US); John Mszal, Bolingbrook, IL (US); John Dallesasse, Geneva, IL (US); Dean Richardson, Wilmette, IL (US); Anthony Moretti, Saint Charles, IL (US)

(73) Assignee: Emcore Corporation, Albuquerque, NM (US)

( * ) Notice: Subject to any disclaimer, the term of this patent is extended or adjusted under 35 U.S.C. 154(b) by 454 days.

(21) Appl. No.: 11/185,008

(22) Filed: Jul. 19, 2005

(65) Prior Publication Data
US 2007/0019964 A1 Jan. 25, 2007

(51) Int. Cl.
*H04B 10/00* (2006.01)

(52) U.S. Cl. ................................. 398/138; 398/164

(58) Field of Classification Search ................. 398/139, 398/156, 164, 200, 201; 385/27, 32, 33, 385/52, 92–94, 101
See application file for complete search history.

(56) References Cited

U.S. PATENT DOCUMENTS

| 5,784,183 | A * | 7/1998 | Aoki et al. ..................... 398/91 |
| 6,318,910 | B1 * | 11/2001 | Higashikawa ................ 385/94 |
| 2003/0053169 | A1 * | 3/2003 | Nasu et al. ................... 359/133 |
| 2003/0223709 | A1 * | 12/2003 | Lake et al. .................... 385/94 |
| 2004/0057653 | A1 * | 3/2004 | Fukuda et al. ................. 385/14 |

* cited by examiner

*Primary Examiner*—Dalzid Singh

(57) ABSTRACT

A hermetically sealed optical transmitter module for use in an optical transceiver converting and coupling an information-containing electrical signal with an optical fiber. A plurality of semiconductor lasers are provided on a common support in the housing for converting between an information-containing electrical signal and a modulated optical signal corresponding to the electrical signal according to a standardized optical communications protocol, such as the IEEE 802.3ae 10 Gigabit BASE LX4 physical layer.

20 Claims, 5 Drawing Sheets

SECTION A-A

MODULAR OPTICAL TRANSMITTER FOR WWDM TRANSCEIVERS

REFERENCE TO RELATED APPLICATIONS

This application is related to copending U.S. patent application Ser. No. 10/879,775 filed Jun. 28, 2004, assigned to the common assignee.

BACKGROUND OF THE INVENTION

1. Field of the Invention

The invention relates to optical transceivers, and in particular to multi-laser transmitter assemblies or modules that provide an communications interface between a computer or communications unit having an electrical output connector or interface and an optical fiber, such as used in high speed fiber optic communications links such as wide wavelength division multiplexed (WWDM) networks.

2. Description of the Related Art

A variety of optical transceivers are known in the art which include an optical transmit portion that converts an electrical signal into a modulated light beam that is coupled to an optical fiber, and a receive portion that receives an optical signal from an optical fiber and converts it into an electrical signal. Traditionally, optical transmitter sections include one or more semiconductor lasers and an optical assembly to focus or direct the light from the lasers into an optical fiber, which in turn, is connected to a receptacle or connector on the transceiver to allow an external optical fiber to be connected thereto. The semiconductor lasers are typically packaged in a hermetically sealed can or similar housing in order to protect the laser from humidity and other harsh environmental conditions. The semiconductor laser chip is typically a few hundred microns to a couple of millimeters wide and 100-500 microns thick. The package in which they are mounted typically includes a heat sink or spreader, and has several electrical leads coming out of the package to provide power and signal inputs to the laser chips. These electrical leads are then soldered to the circuit board in the optical transceiver.

In high speed systems requiring the use of several lasers, the hermetic packages take considerable space, and it is desirable to provide a more compact arrangement.

SUMMARY OF THE INVENTION

1. Objects of the Invention

It is an object of the present to provide an improved optical transceiver using a modular, interchangeable transmitter subassembly.

It is another object of the present invention to provide a hermetically sealed transmitter module for use with different optical data transmission standards and containing a plurality of optoelectronic components.

It is also another object of the present invention to provide an optical transmitter for use in an optical fiber transmission system with an industry standard 10GBASE-LX4 physical layer.

It is still another object of the present invention to provide an optical transmitter for use in an optical wavelength division multiplexed (WDM) transmission system suitable for short range and long haul applications using multiple semiconductor laser chips mounted in a single hermetically sealed package.

It is still another object of the present invention to provide an optical transceiver capable of field upgrade of the optical transmitter module.

It is still another object of the present to provide improved heat dissipation in an optical transmitter by using heat conductive pathways from semiconductor lasers to the housing or case.

It is still another object of the present invention to provide an optical multiplexer in an assembly that may be quickly and easily aligned with a multiple laser subassembly and permanently affixed thereto by spot laser welding.

It is also another object of the present invention to provide an optical transceiver for use in an optical transmission system with key components packaged in hermetically sealed enclosures to protect them from exposure to environmental conditions.

It is still another object of the present invention to provide an optical transmitter that is easily manufacturable by using simplified electro-optical component mounting and alignment techniques.

2. Features of the Invention

Briefly, and in general terms, the present invention provides an optical transceiver for converting and coupling an information-containing electrical signal with an optical fiber including a housing including an electrical connector for coupling with an external electrical cable or information system device and a fiber optic connector adapted for coupling with an external optical fiber, at least one electro-optical subassembly in the housing for converting between an information containing electrical signal and a modulated optical signal corresponding to the electrical including a transmitter subassembly including first and second lasers operating at different wavelengths and modulated with respective first and second electrical signals for emitting first and second laser light beams, and an optical multiplexer for receiving the first and second beams and multiplexing the respective optical signals into a single multi-wavelength beam.

In still another aspect of the invention, there is provided a transmitter subassembly including an optical multiplexer coupled to a fiber optic connector for transmitting a multi-wavelength optical signal having a plurality of information-containing signals each with a different predetermined wavelength. The optical multiplexer functions to convert the optical signals into a single optical signal composed of signals on different predetermined wavelengths. The subassembly includes a hermetically sealed housing including an array of plurality of lasers disposed therein for generating a plurality of laser beams at different wavelengths.

In another aspect of the invention, the invention provides a modular transmitter subassembly that includes interchangeable or reprogrammable circuit subcomponents, such as lasers, laser drivers, and electrically programmable read only memory. Such subcomponents enable simplified manufacturability and mass customization for a wide variety of different optical band requirements, fiber types, communications protocols, range options, or applications. It also enables the unit to be quickly reconfigured to handle a different optical network or protocol, physical layer, or upper media access control layers, by simply removing one module board and substituting another, or reprogramming an EEPROM on the board.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWING

These and other features and advantages of this invention will be better understood and more fully appreciated by reference to the following detailed description when considered in conjunction with the accompanying drawings, wherein.

Figure 1:
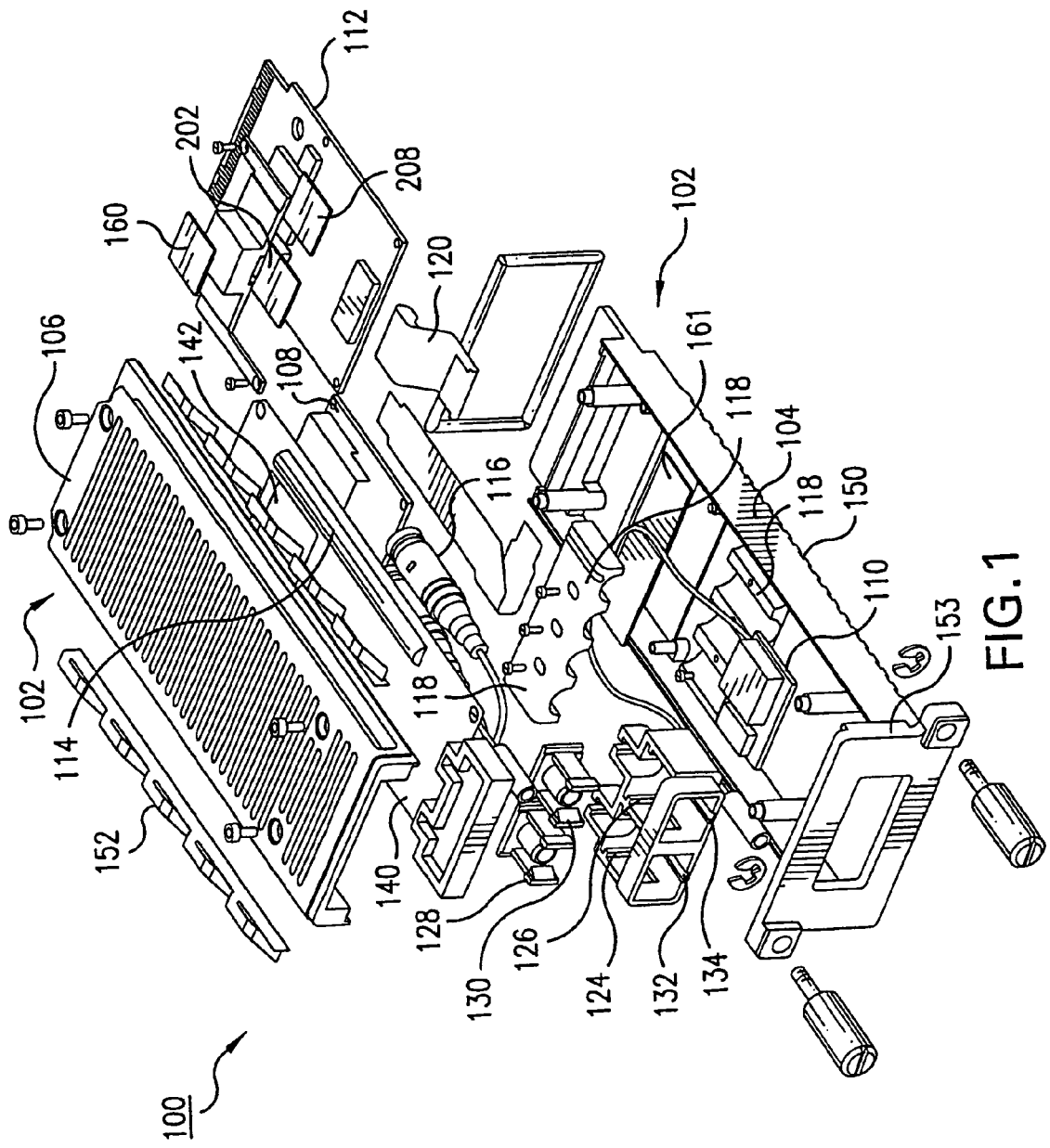
FIG. 1 is an exploded perspective view of an optical transceiver in an exemplary embodiment in accordance with aspects of the present invention.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Referring more particularly to FIG. 1, there is provided an optical transceiver 100 for operating over both multimode (MM) and single mode (SM) fiber using multiple laser light sources, multiple photodetectors, and an optical multiplexing and demultiplexing system. This design enables a single transceiver to be adaptable or configurable to communicate over different optical networks using multiple protocols and satisfying maximum range and distance goals. The transceiver 100 and its housing 102 are designed such that maximum operating efficiency is achieved cost effectively and at reduced electromagnetic interference (EMI) and thermal levels in an industry standard form factor or package design.

Advantageously, the transceiver 100 is manufactured in a modular manner preferably using three separately mounted circuit boards mounted in the housing—a transmitter subassembly, a receiver subassembly, and a protocol processing board, with each board having dedicated functions and electrically connected to each other using either flex circuitry or mating multipin connectors land grid arrays, or other electrical interconnect devices. This enables the basic transceiver module to be configured to different protocols and to support different optoelectronic devices using a simple subassembly configuration change, thus minimizing manufacturing costs and eliminating the need for manufacturing different transceivers for each different application. In addition, the use of flex circuitry or detachable connectors to interconnect the boards allows for a modular interchangeable board design (e.g., receiver, transmitter and PCS functionality each on separate boards). Although the preferred design uses three boards, any two of the functions may be combined on a single board for an even more compact design.

The modularity of the board design also enables the placement of heat-sensitive components in the optimal location with respect to the heat-generating components (lasers and ICs) within the module housing 102. It also makes it convenient and realistic to test and troubleshoot separate modular subassemblies independently before final assembly. In addition, the flex or other interconnects allow for manufacturing of the various boards (RX, TX, PCS) to proceed in parallel instead of in serial, hence reducing the manufacturing time for the entire unit.

Referring now to FIG. 1 an exemplary optical transceiver module 100 is shown according to a preferred embodiment of the present invention. In this particular embodiment, the module 100 is compliant with the IEEE 802.3ae 10GBASE-LX4 Physical Media Dependent sub-layer (PMD) and is implemented in the XENPAK™ form factor. It is to be noted, however, that the transceiver module 100 may be configured to operate under various other standard protocols (such a Fibre Channel or SONET) and be manufactured in various alternate form factors such as X2 or XFP. The module 100 is preferably a 10 Gigabit Wide Wavelength Division Multiplexed (WWDM) transceiver having four 3.125 Gbps distributed feedback lasers and provides 300 meter transmission over legacy installed multimode fiber and from 10 to 40 km over standard single mode fiber.

The transceiver module 100 includes a two-piece housing 102 with a base 104 and a cover 106. In addition, contact strips 152 are provided to ground the module to chassis ground as well. The housing 102 is constructed of die-cast or milled metal, preferably die-cast zinc, although other materials also may be used, such as specialty plastics and the like. Preferably, the particular material used in the housing construction assists in reducing EMI. Further EMI reduction may be achieved by using castellations (not shown) formed along the edges of the housing 102.

The front end of the housing 102 includes a faceplate 153 for securing a pair of receptacles 124, 126. The receptacles 124, 126 are configured to receive fiber optic connector plugs 128, 130. In the preferred embodiment, the connector plugs or receptacle 128, 130 are configured to receive industry standard SC duplex connectors (not shown) which are attached to the end of an optical fiber. As such, keying channels 132 and 134 are provided to ensure that the SC connectors are inserted in their correct orientation. Further, as shown in the exemplary embodiment and discussed further herein, the connector receptacle 130 receives an SC transmitting connector and the connector plug 128 receives an SC receiver connector.

In particular, the housing 102 holds three circuit boards, including a transmit board 108, a receive board 110 and a physical coding sublayer (PCS)/physical medium attachment (PMA) board 112, which is used to provide an electrical interface to external electrical systems (not shown) via connector 113 that is implemented by a sequence of parallel printed contact pads on the upper and lower surface of the board 112. The transmit board 108 includes a transmitter subassembly 400, as shown in more detail in FIG. 2, which includes four distributed feedback (DFB) semiconductor lasers 403 mounted in a single, hermetically sealed enclosure 402. The transmit board 108 is secured in place at the bottom of the housing 102 using a brace 418 attached to the coupling subassembly 401. The brace 418 also functions as a heat sink for dissipating heat from the metallic coupling subassembly 401.

In addition, the transmit board 108 and receive board 110 are connected to the PCS/PMA board 112 by respective flex interconnect 120, or other board-to-board connectors. Thermally conductive gap pads 160 and 161 are provided to transmit the heat generated by the lasers or other components in the transmitter subassembly to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. As illustrated more particularly in FIG. 2, the transmitter subassembly 400 includes the output of the four lasers 403 is input into a single optical fiber 117 which coils and reverses direction and is attached or mounted on a flexible substrate 140. The substrate 140 may be an optical flexible planar material, such as FlexPlane™ available from Molex, Inc. of Lisle, Ill., although other flexible substrate may be used as well. As shown, the optical fiber 117 originating from the transmitter subassembly 400 mounted to the substrate 140 and routed to the transmit connector plug 130, which is attached to the housing 102. The fiber 117 is routed and attached in such a manner as to minimize sharp bends in the optical fiber to avoid optical loss and mechanical failure.

Figure 2:
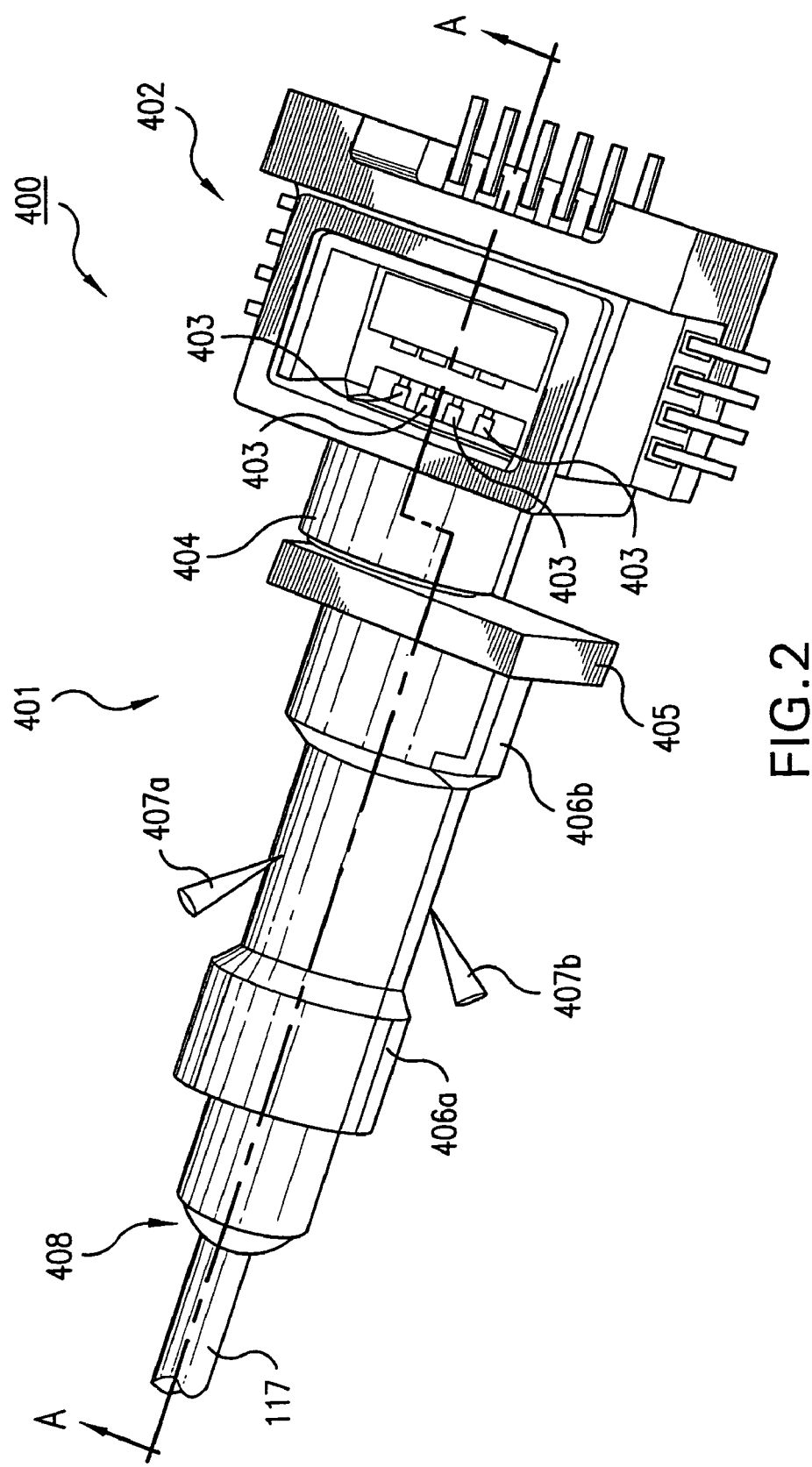
FIG. 2 is a top perspective view of the transmitter subassembly in the transceiver of FIG. 1.

FIG. 2 is a top perspective view of the transmitter subassembly 400 depicting the hermetically sealed laser subassembly 402 and the coupling subassembly 401. The laser subassembly includes four semiconductor lasers 403 in die form which are mounted on an optical bench 416 to achieve alignment with an external optical multiplexer (or MUX).

Figure 4A:
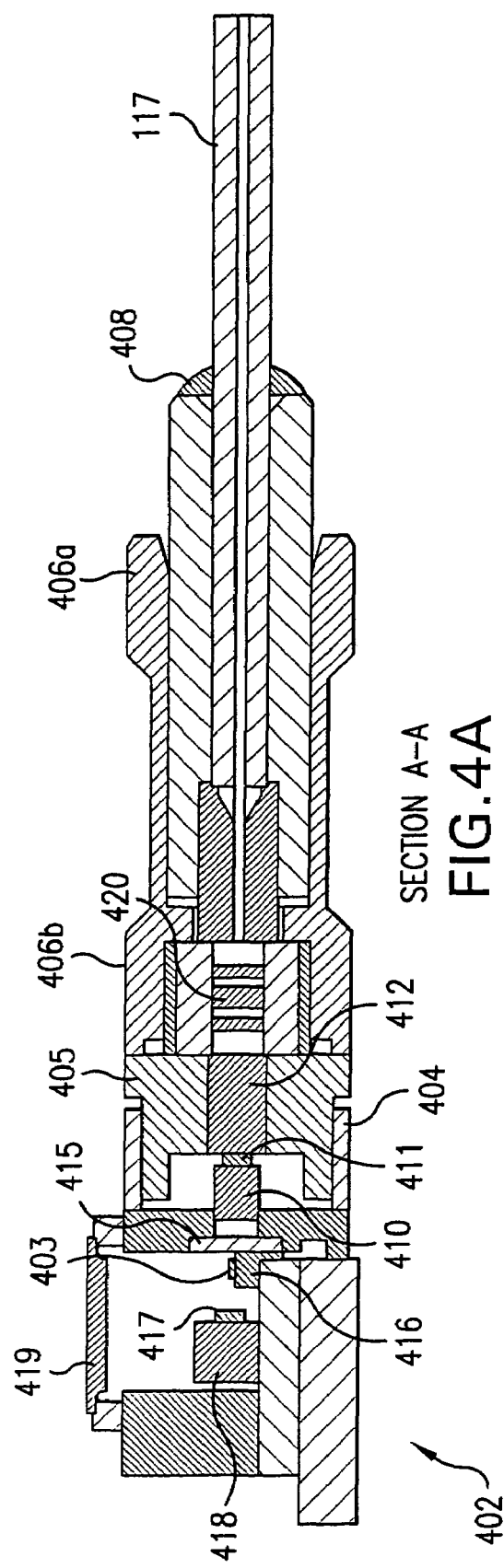
FIGS. 4A and 4B are cross-sectional views of the transmitter subassembly through the A-A and B-B planes respectively shown in FIG. 3

The coupling subassembly 401 includes a cylindrical weld sleeve 404 that is illuminated through the sapphire window 415, shown in FIG. 4A. The coupling subassembly 401 further includes an optical multiplexer disposed within a housing 405, and a concentric cylindrical sleeve 406b attached to the housing 405. The optical fiber 117 is contained within a ferrule assembly 408, which aligns with an attaches to a ferrule-isolator housing 406a. The sleeve extending between cylindrical sleeve 406b and housing 406a allows the ferrule assembly 408 to be aligned to the output port of the multiplexer, and fixed in place using coaxial laser welding, as diagrammatically depicted at 407a and 407b.

Figure 3:
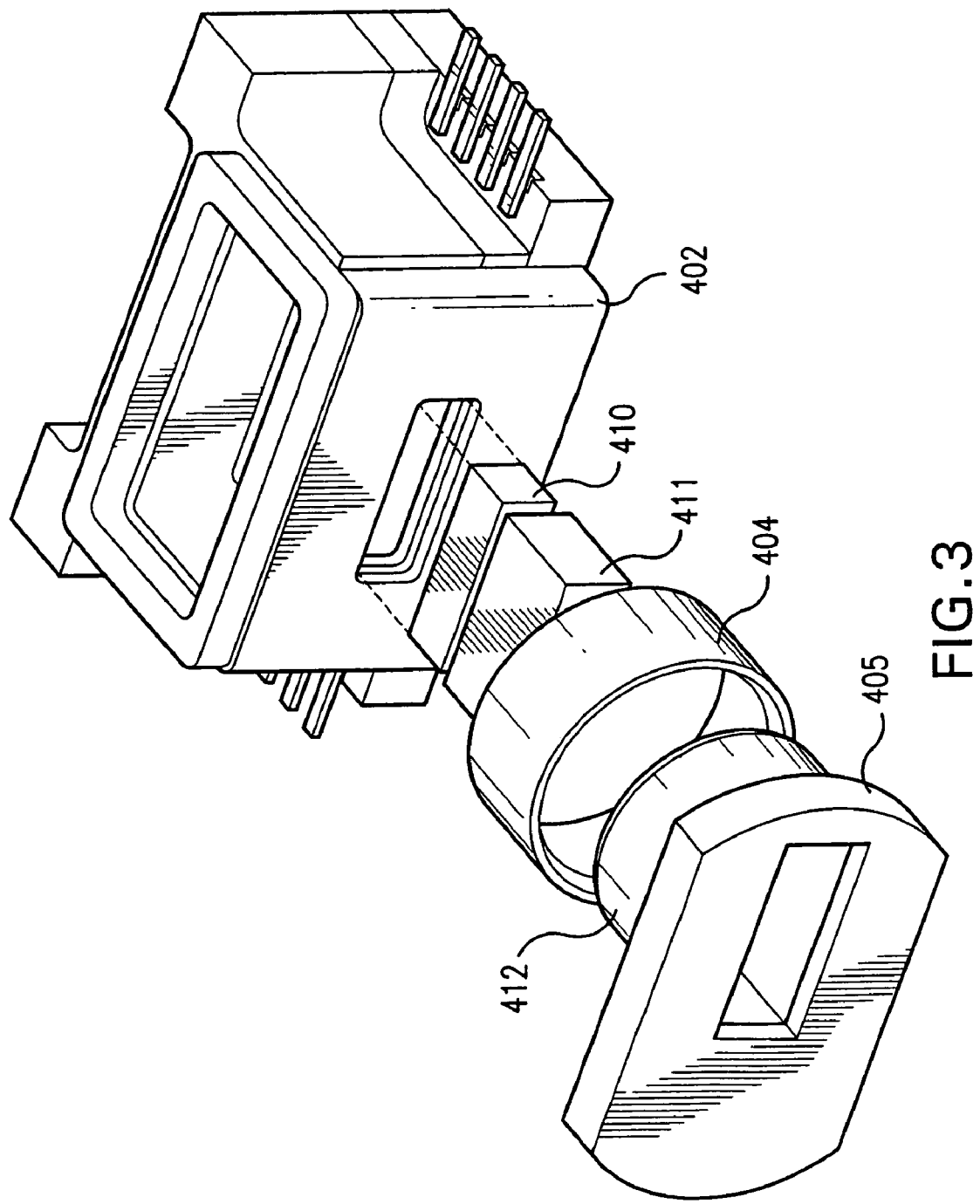
FIG. 3 is an exploded view of the transmitter subassembly shown in FIG. 2.

FIG. 3 is an exploded view of the components within the cylindrical weld sleeve 404. More particularly, there is shown a laser lens array, a collimator, and the optical multiplexer, and a cylindrical housing 405 which supports the multiplexer 412.

Figure 4B:
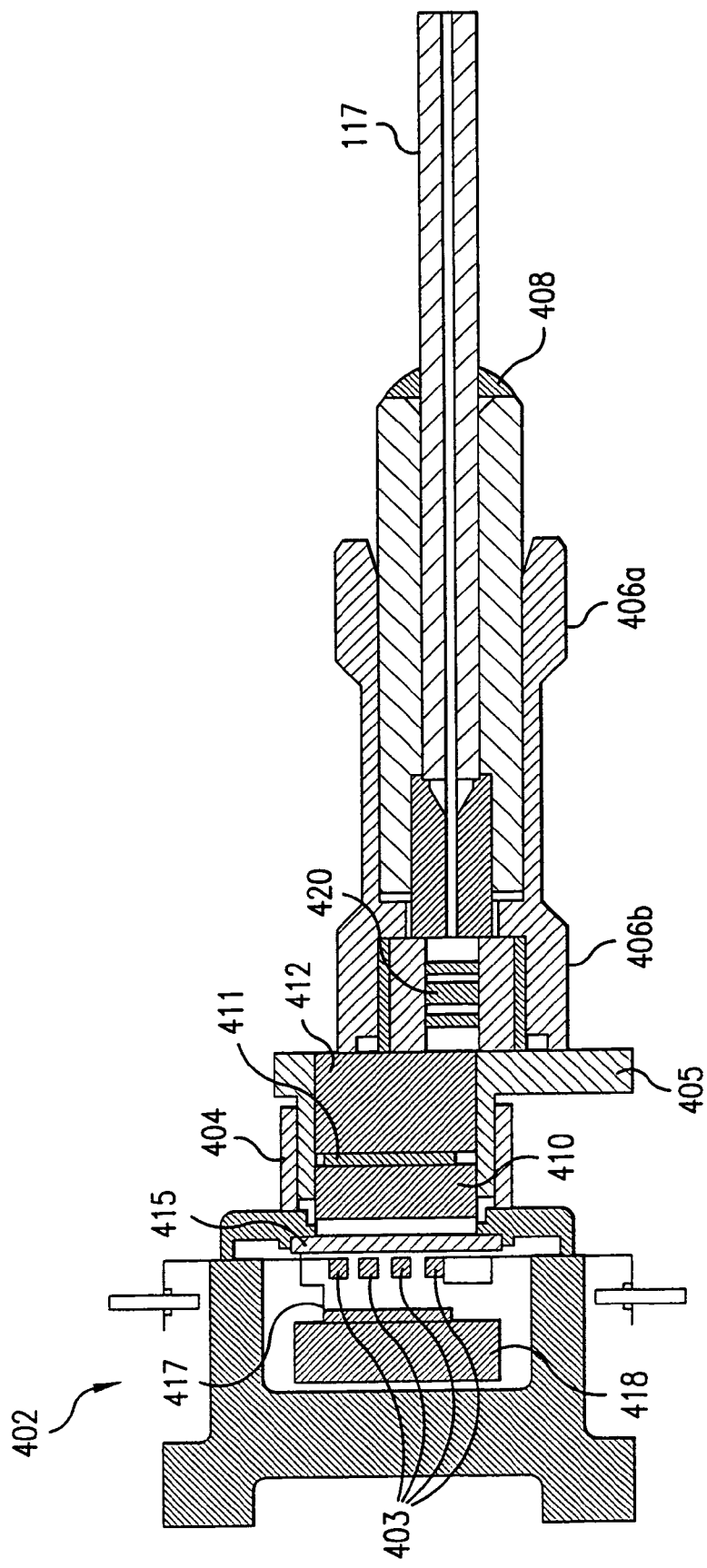

FIG. 4A depicts a cross-sectional view of the transmitter subassembly through the A-A plane shown in FIG. 2. The B-B plane is 90 degrees, or orthogonal, to the A-A plane. FIG. 4B is the cross-sectional view of the transmitter subassembly through the B-B plane.

The combination of a cylindrical housing 405 the optical multiplexer 412 and the concentric cylindrical sleeve 404 allows the multiplexer 412 to be aligned and fixed in place with high precision housing 405 using environmentally robust adhesive materials. Once micron-scale alignment between the laser sources and the multiplexer channels is established using active alignment, coaxial laser welding can lock the position of the multiplexer housing 405 with respect to the cylindrical weld sleeve 404. The sleeve 404 is then attached to the front of the hermetic package 402 in a fashion that preserves alignment accuracy.

It will be understood that each of the elements described above, or two or more together, also may find a useful application in other types of constructions differing from the types described above.

While the invention has been illustrated and described as embodied in a hermetically sealed optical transmitter for use in an optical transceiver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. An optical transmitter for converting and coupling an information-containing electrical signal with an optical fiber comprising:
   a hermetically sealed housing including an electrical connector receiving an information-containing electrical communications signal, and a fiber optic connector adapted for coupling with an external optical fiber for transmitting an optical communications signal;
   a transmitter subassembly disposed in said housing and including first and second lasers operating at different wavelengths and modulated with respective first and second electrical signals for emitting first and second laser light beams;
   a optically transparent window in the housing;
   an optical multiplexer coupled to said housing and disposed outside the housing in the path of said first and second beams through the optically transparent window for multiplexing the respective optical signals into a single multi-wavelength beam that is coupled to said fiber optic connector for transmitting the optical signal to an external optical fiber; and
   a coupling subassembly that supports the optical multiplexer and that actively aligns the optical multiplexer with respect to the first and second laser beams during assembly of the transmitter subassembly.

2. An optical transmitter as defined in claim 1, wherein said transmitter subassembly includes a plurality of lasers mounted on a common substrate and emitting parallel light beams.

3. An optical transmitter as defined in claim 1, wherein said transmitter sub-assembly includes an alignment sleeve for spatially adjusting the interface between the transmitter subassembly and the optical multiplexer.

4. A transmitter as defined in claim 1, wherein the optical multiplexer is disposed within a coupling subassembly that is attached to said transmitter subassembly.

5. A transmitter as defined in claim 1, wherein the transmitter subassembly includes a casing with at least one aperture, the aperture being sized and configured to allow the laser beams to be emitted to the exterior of the housing.

6. A transmitter as defined in claim 5, further comprising a laser driver integrated circuit.

7. A transmitter as defined in claim 5, wherein the casing is hermetically sealed; and
   said aperture is a window.

8. A transmitter as defined in claim 1, wherein the optical communications signal is compliant with IEEE 802.3ae 10GBASE-LX4.

9. An optical transmitter comprising:
   an integral, hermetically sealed housing;
   a laser subassembly disposed in said housing including a plurality of lasers arranged so that the emitted beams from said lasers are substantially parallel, and a window on said housing for allowing the transmission of the beams to the exterior of the housing;

an optically transparent window in the housing;

an optical subassembly disposed adjacent to and outside of said housing in the path of said beams through the optically transparent window for coupling to an optical fiber; multiplexing the optical signals on each of the respective beams into a single beam for coupling to an optical fiber;

a sleeve for connecting the optical subassembly to said window and spatially aligning the parallel beams with said optical subassembly.

10. A transmitter as defined in claim 9, wherein the optical subassembly includes a substantially cylindrical housing concentrically mating with said sleeve.

11. A transmitter as defined in claim 9, wherein the optical subassembly includes an optical block mounted inside said housing in the path of said respective beams.

12. In an optical transceiver for converting and coupling an information-containing electrical signal with an optical fiber having housing including an electrical connector for coupling with an external electrical cable or information system device and for transmitting and/or receiving an information-containing electrical communications signal, and a fiber optic connector adapted for coupling with an external optical fiber for transmitting and/or receiving an optical communications signal; and at least one electro-optical subassembly for converting between an information-containing electrical signal and a modulated optical signal corresponding to the electrical signal from which at least one optical fiber extends, a transmitter subassembly comprising:

a hermetically sealed subassembly including a plurality of semiconductor lasers mounted on a common support and arranged so that the emitted beams from said lasers are substantially parallel;

an optically transparent window in the hermetically sealed subassembly;

an optical multiplexer disposed outside the hermetically sealed subassembly in a path of the emitted beams through the optically transparent window;

a coupling subassembly that supports that optical multiplexer and that actively aligns the optical multiplexer with the emitted beams during assembly of the coupling subassembly to the hermetically sealed subassembly; and a pigtail optical fiber attached to said subassembly for optically coupling the output of said multiplexer with an external optical component.

13. A transmitter as defined in claim 12, further comprising a hermetically sealed enclosure supporting said subassembly, including a window for transmitting the beams to the exterior of the enclosure.

14. A transmitter as defined in claim 12, further comprising an optical block including a lens array in the path of said respective beams.

15. A transmitter as defined in claim 14, wherein said optical block is disposed within a sleeve which is aligned and fixed in place by an adhesive.

16. A transmitter as defined in claim 14, wherein said sleeve is adjustable in the plane of said window to allow the beams exiting from the window to align with the lens array.

17. A transmitter as defined in claim 14, wherein said sleeve is axially adjustable with respect to said sleeve to allow the distance between said lasers and said lens array to be aligned and fixed in place.

18. A transmitter as defined in claim 14, further comprising an isolator in the path of the optical beam exiting from the optical block.

19. A transmitter as defined in claim 18, further comprising a housing for supporting said isolator and including a receptacle for receiving a ferrule for allowing said optical fiber to be secured to the housing and optically aligning the beam exiting from the isolator to be coupled with the optical fiber.

20. A transmitter as defined in claim 19, wherein said housing supporting the isolator and the ferrule are attached by means of a laser weld.

* * * * *